United States Patent
Schmidt

(10) Patent No.: US 6,524,215 B1
(45) Date of Patent: Feb. 25, 2003

(54) MULTIPLE RATIO SERIES ELECTRIC VEHICLE DRIVETRAIN

(75) Inventor: Michael Roland Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/921,827

(22) Filed: Aug. 6, 2001

(51) Int. Cl.⁷ ................................................ B60K 1/02
(52) U.S. Cl. ........................................................ 477/3
(58) Field of Search ............................ 477/3; 180/65–67

(56) References Cited

U.S. PATENT DOCUMENTS

| | | | | | |
|---|---|---|---|---|---|
| 5,571,058 A | * | 11/1996 | Schmidt | ........................ | 475/5 |
| 5,730,676 A | * | 3/1998 | Schmidt | ........................ | 475/5 |
| 5,931,757 A | * | 8/1999 | Schmidt | ........................ | 475/2 |
| 5,935,035 A | * | 8/1999 | Schmidt | ........................ | 475/5 |
| 6,090,005 A | * | 7/2000 | Schmidt et al. | ................. | 475/5 |
| 6,300,735 B1 | * | 10/2001 | Stemler | ...................... | 318/433 |
| 6,358,173 B1 | * | 3/2002 | Klemen et al. | ................. | 475/5 |

* cited by examiner

Primary Examiner—Dirk Wright
(74) Attorney, Agent, or Firm—Leslie C. Hodges

(57) ABSTRACT

A series electric drivetrain includes a multiple speed, mechanically-shifted transmission driven by a pair of electric motors. Input power is provided by both electric motors during operation in any given speed ratio, and by only one of the electric motors during shifting between speed ratios. During shifting, the motor not providing input power is released from the output, and accelerated or decelerated to a post-shift speed. When the released motor reaches the post-shift speed, a clutch is synchronously engaged to complete the shift, and the motors resume a shared supply of the transmission input power.

8 Claims, 2 Drawing Sheets

MULTIPLE RATIO SERIES ELECTRIC VEHICLE DRIVETRAIN

TECHNICAL FIELD

This invention relates to an electrically-powered drivetrain configuration for a vehicle, and more particularly to a multiple ratio transmission driven by a pair of electric motors.

BACKGROUND OF THE INVENTION

In a series electric drivetrain, an electric motor is drivingly coupled to the vehicle wheels through a transmission gear arrangement, and electric power for operating the motor is obtained from an engine-driven generator, storage batteries, or a fuel cell, for example. To minimize the power requirements of the electric motor, the transmission may be designed to provide two or more speed ratios, much like a transmission for an internal combustion engine. In such case, shifting from one speed ratio to another can be performed either by using hydraulically-activated clutches to absorb the shift energy or by mechanically shifting the transmission during an input power interruption. The hydraulic approach significantly increases the cost of the drivetrain, while the mechanical approach requires an undesired power interruption. Accordingly, what is desired is a series drivetrain that has the cost advantages of the mechanical approach, without a power interruption.

SUMMARY OF THE INVENTION

The present invention is directed to an improved series electric drivetrain in which a multiple speed, mechanically-shifted transmission is driven by a pair of electric motors, and where the input power is provided by both electric motors during operation in any given speed ratio, and by only one of the electric motors during shifting between speed ratios. Preferably, the electric motors are each rated at one-half of the continuous input power requirement of the drivetrain, and one of the motors is released from the output during shifting while the other carries a peak load of twice the continuous rating. When the released motor has decelerated to the post-shift speed, a mechanical clutch is synchronously engaged to complete the shift, and the motors resume a shared supply of the transmission input power. In this way, the cost advantages of a mechanically-shifted transmission are realized without requiring a power interruption during transmission shifting.

DESCRIPTION OF THE PREFERRED EMBODIMENT

Figure 1:
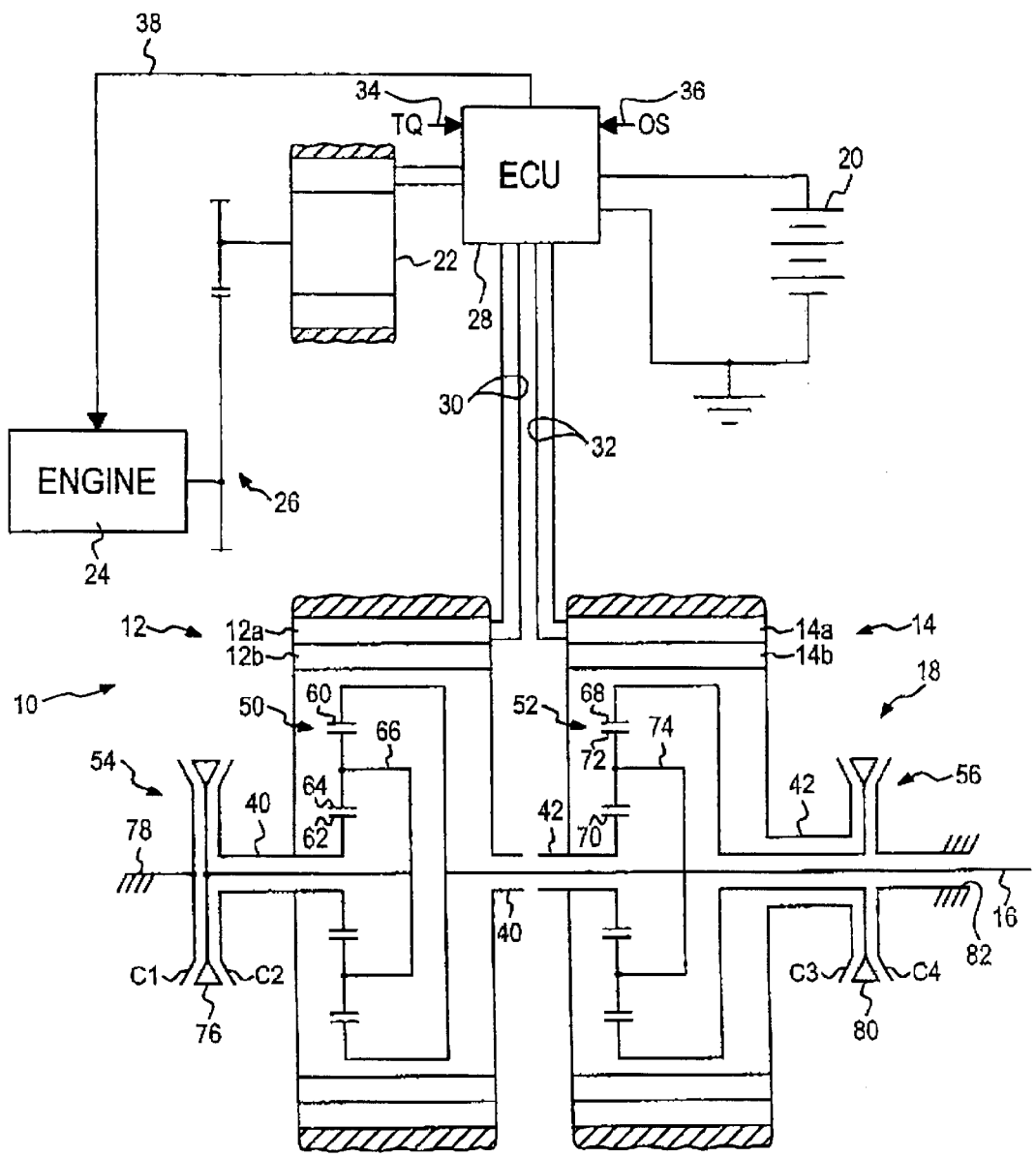
FIG. 1 is a schematic representation of a preferred drive arrangement according to this invention, including a three-speed series transmission driven by a pair of electric drive motors, and an engine-driven generator for supplying electric power to the drive motors.

Referring to FIG. 1, the reference numeral 10 generally designates a series electric vehicle drivetrain according to this invention. The drivetrain 10 includes two electric motors 12, 14 coupled to an output shaft 16 through a three-speed planetary transmission 18. The output shaft 16, in turn, is coupled to the vehicle drive wheels through a conventional differential gearset (not shown). In the illustrated embodiment, the motors 12, 14 are configured as induction machines, each having a fixed stator 12a, 14a, and a rotor 12b, 14b mounted on a respective transmission sleeve shaft 40, 42. As explained below, the motors 12 and 14 share the drivetrain input load, and preferably, each is designed to continuously supply one-half of the input power requirement. In the illustrated embodiment, electrical power for driving the electric motors 12, 14 is obtained from the combination of a storage battery 20 and a generator 22 mechanically driven by an internal combustion engine 24 via a simple gear arrangement 26. The battery 20 and generator output windings are coupled to a microprocessor-based electronic control unit (ECU) 28, which includes suitable inverter circuitry for charging battery 20 and for energizing the electric motors 12, 14 via lines 30, 32 in response to various input signals, such as a driver torque request signal (TQ) on line 34 and an output shaft speed signal (OS) on line 36. The ECU 28 may also control the running speed of engine 24, as indicated by line 38.

The transmission 18 includes two coupled planetary gearsets 50 and 52, and two friction or dog-type clutch mechanisms 54, 56. In customary fashion, each planetary gearset 50, 52 includes an outer (ring) gear circumscribing an inner (sun) gear, and a plurality of pinion gears rotatably mounted on a carrier such that the pinion gears meshingly engage both the outer gear and the inner gear. Thus, the gearset 50 includes a ring gear 60, a sun gear 62, and a set of pinion gears 64 mounted on a carrier 66; and the gearset 52 includes a ring gear 68, a sun gear 70, and a set of pinion gears 72 mounted on a carrier 74. As shown in FIG. 1, the ring gear 60 and planet carrier 74 are coupled to the output shaft 16, sun gear 62 is coupled to the sleeve shaft 40, and sun gear 70 is coupled to the sleeve shaft 42. The clutch mechanism 54 includes a central disk 76 attached to planet carrier 66 for selectively coupling planet carrier 66 to a grounded shaft 78 via clutch C1 or to sleeve shaft 40 via clutch C2. Similarly, the clutch mechanism 56 includes a central disk 80 attached to ring gear 68 for selectively coupling ring gear 68 to sleeve shaft 42 via clutch C3 or a grounded sleeve shaft 82 via clutch C4.

A first configuration providing Reverse, Neutral and a first ($1^{st}$) forward speed ratios is established by engaging clutches C1 and C4. A second configuration providing a second ($2^{nd}$) forward speed ratio is established by engaging clutches C1 and C3, and a third configuration providing a third ($3^{rd}$) forward speed ratio is established by engaging clutches C2 and C3. Shifting among the forward speed ratios is achieved by releasing one of the engaged clutches to release a respective electric machine, bringing the speed of the released electric machine to a post-shift speed, and then synchronously engaging a clutch associated with the new speed ratio. For example, shifting from $1^{st}$ to $2^{nd}$ involves (1) releasing clutch C4, (2) decelerating motor 14 to a post-shift speed, and (3) synchronously engaging clutch C3. The vehicle continues to accelerate during each such shift due to the torque produced by unreleased motor, and the motors 12 and 14 share the load torque except during shifting.

Figure 2:
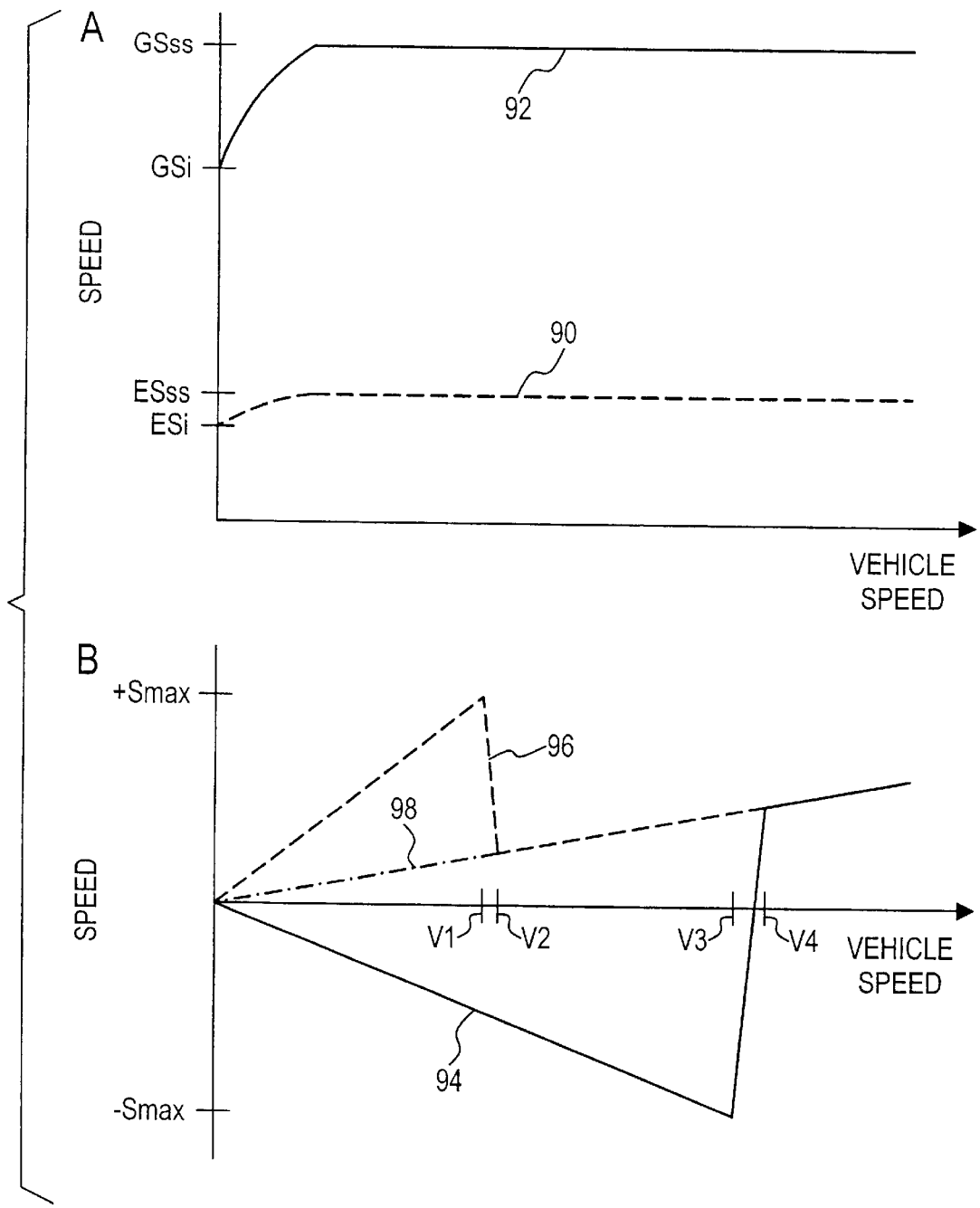
FIG. 2, Graphs A and B, depict the speeds of the electrical motors, the engine, the generator, and the transmission output shaft of the drivetrain depicted in FIG. 1, all as a function of vehicle speed.

The above-described operation for forward vehicle movement is now described in reference to Graphs A–B of FIG. 2 in the context of a full power acceleration. Graph A depicts the speed of engine 24 as the dashed trace 90 and the speed of generator 22 as the solid trace 92, both as a function of vehicle speed. Graph B depicts the speed of machine 12 as the solid trace 94, the speed of machine 14 as the dashed trace 96, and the speed of output shaft 16 as the chain-dot trace 98, all as a function of vehicle speed. The shift from $1^{st}$ to $2^{nd}$ occurs in the vehicle speed interval V1–V2, while the shift from $2^{nd}$ to $3^{rd}$ occurs in the vehicle speed interval V3–V4.

When the vehicle is stationary, the clutches C1 and C4 are engaged to ground the planet carrier 99 of gearset 50 and the ring gear 68 of gearset 52. The engine 24 idles at idle speed ESi, and generator 22 is driven at an idle speed of GSi, as indicated in Graph A. At such point, the motors 12 and 14 may be de-energized to establish a Neutral range. When the Forward or Reverse range is selected, the output shaft 16 is driven in a positive direction to produce forward vehicle movement by driving motor 12 in a negative direction, and motor 14 in a positive direction, as indicated by traces 94, 96 and 98. The load torque is shared in this way by motors 12 and 14 until the speed of motor 14 reaches a limit speed +Smax at vehicle speed V1. At such point, clutch C4 is released, and motor 14 is decelerated until it reaches the output shaft speed, which occurs at vehicle speed V2. During this interval, the entire load torque is borne by motor 12, which continues to be driven in the negative direction as shown. If the motors 12 and 14 are each designed to continuously produce approximately one-half the required output torque, the load torque of motor 12 will increase to approximately twice its continuous rating during the shift, but the time required to decelerate motor 14 to the output shaft speed is relatively short (since only the inertia of the motor 14 and gearset 52 have to be overcome), and the temporarily elevated loading of motor 12 can be easily sustained without damage or overheating. When the speed of motor 14 reaches the output shaft speed, the ring gear 68, sun gear 70 and planet carrier 74 of gearset 52 all rotate at the output shaft speed, allowing the clutch C3 to be synchronously engaged. Thereafter, the motors 12 and 14 share the load torque, with motor 12 still being driven in the negative direction, and motor 14 still being driven in the positive direction at the speed of output shaft 16. The $2^{nd}$ speed ratio is maintained until motor 12 reaches a limit speed −Smax at vehicle speed V3. At such point, clutch C2 is released, and motor 12 is decelerated to zero speed and then accelerated until it reaches the output shaft speed, which occurs at vehicle speed V4. During this interval, the entire load torque is borne by motor 14, which continues to be driven in the positive direction as shown. Again, if the motors 12 and 14 are each designed to continuously produce approximately one-half the required output torque, the load torque of motor 14 will increase to approximately twice its continuous rating during the shift, but the time required to bring motor 12 to the output shaft speed is relatively short (since only the inertia of the motor 12 and gearset 50 have to be overcome), and the temporarily elevated loading of motor 14 can be easily sustained without damage or overheating. When the speed of motor 12 reaches the output shaft speed, the ring gear 60, sun gear 62 and planet carrier 66 of gearset 50 all rotate at the output shaft speed, allowing clutch C2 to be synchronously engaged. Thereafter, the motors 12 and 14 share the load torque, with both motors 12 and 14 being driven in the positive direction, at the speed of output shaft 16.

In summary, the present invention provides an improved series electric drivetrain in which a multiple speed, mechanically-shifted transmission is driven by a pair of electric motors, and where the input power is provided by both electric motors during operation in any given speed ratio, and by only one of the electric motors during shifting between speed ratios. During a shift, the motor not providing input power is released from the output and accelerated or decelerated to a post-shift speed equal to the output shaft speed. When the released motor reaches the post-shift speed, a clutch is synchronously engaged to complete the shift, and the motors resume a shared supply of the transmission input power. Since the clutches are synchronously engaged and disengaged for each of the shifts, the clutches C1–C4 may be implemented with simple mechanically-activated friction clutches, or dog or spline-type mechanical clutches. In this way, the cost advantages of a mechanically-shifted transmission are realized without requiring a power interruption during transmission shifting.

While the present invention has been described in reference to the illustrated embodiments, it is expected that various modifications in addition to those mentioned above will occur to those skilled in the art. For example, the engine 24 and generator 22 may be replaced with an alternate electrical power source, such as a fuel cell. Also, the transmission may be configured to provide a different number of speed ratios; for example, a two-speed gearset can be achieved with a single planetary gearset, with motor 12 connected directly to output shaft 16, and motor 14 coupled to gearset 52 as shown in FIG. 1. By way of further example, a four-speed gearset can be achieved by coupling the planet carriers of both gearsets 50, 52 to the output shaft 16, and using four discrete clutches to selectively ground the ring gears 60, 68, and to couple the planet carrier and sun gear of each gearset. Obviously, other arrangements are also possible. Thus, it will be understood that drive configurations incorporating these and other modifications may fall within the scope of this invention, which is defined by the appended claims.

What is claimed is:

1. A series electric drivetrain having an output shaft, comprising:

first and second electric motors coupled to the output shaft, the first electric motor being coupled to the output shaft through a first gearset arrangement;

a first clutching mechanism coupled to said first gearset arrangement for selectively establishing first, second, or neutral speed ratios through said first gearset arrangement; and a controller for shifting from said first speed ratio to said second speed ratio by controlling the first clutching mechanism to select the neutral speed ratio of said first gearset arrangement while changing a speed of said first motor to a first synchronous speed, and then controlling the first clutching mechanism to select the second speed ratio.

2. The drivetrain of claim 1, where said first and second electric motors share a torque load of said drivetrain when said first or second speed ratios are established, and said second electric motor supplies the torque load of said drivetrain during shifting from said first speed ratio to said second speed ratio.

3. The drivetrain of claim 1, wherein said first synchronous speed is a speed of said output shaft.

4. The drivetrain of claim 2, further comprising:

a second gearset arrangement coupling the second electric motor to the output shaft;

a second clutching mechanism coupled to said second gearset arrangement for selectively establishing first, second, or neutral speed ratios through said second gearset arrangement, wherein the controller also controls shifting from the first speed ratio to the second speed ratio of the second gearset arrangement, during the establishment of said first or second speed ratios of said first gearset arrangement, by controlling the second clutching mechanism to select the neutral speed ratio of said second gearset arrangement while changing a speed of said second motor to a second synchronous speed, and then controlling the second clutching mechanism to select the second speed ratio.

5. The drivetrain of claim 4, wherein said second synchronous speed is a speed of said output shaft.

6. A series electric drivetrain having an output shaft, comprising:

a first electric drive including a first electric motor, a planetary gearset having a first gear element coupled to said first electric motor, a second gear element coupled to said output shaft, and a third gear element which is selectively released, grounded or coupled to said first gear element to respectively establish a neutral, first or second speed ratio between said first electric motor and said output shaft;

a second electric drive including a second electric motor coupled to said output shaft; and a controller for powering said first and second motors during establishment of said first and second speed ratios for shared driving of said output shaft, and shifting between said first and second speed ratios by releasing said third gear element to establish said neutral speed ratio while maintaining the powering said second motor.

7. The drivetrain of claim 6, wherein the controller drives said first electric motor to a post-shift speed while said third gear element is released, and then couples said third gear element to said first gear element to establish said second speed ratio.

8. The drivetrain of claim 6, wherein the first gear element of said planetary gearset is a sun gear, and the third gear element of said planetary gearset is a planet carrier or a ring gear.

* * * * *